United States Patent [19]

Segawa et al.

[11] Patent Number: 4,675,765
[45] Date of Patent: Jun. 23, 1987

[54] MAGNETIC RECORDING AND/OR REPRODUCING ELEMENT

[75] Inventors: Keiji Segawa, Sagamihara; Hirofumi Imaoka, Yokosuka; Hisao Kinjo, Yokohama; Toshiya Sakurai, Sagamihara, all of Japan

[73] Assignee: Victor Company of Japan, Ltd., Yokohama, Japan

[21] Appl. No.: 683,859

[22] Filed: Dec. 20, 1984

[30] Foreign Application Priority Data

Dec. 20, 1983 [JP] Japan .................................. 58-240697

[51] Int. Cl.$^4$ ............................................. G11B 5/187
[52] U.S. Cl. ..................................... 360/122; 360/125
[58] Field of Search ............... 360/125, 123, 122, 119, 360/120, 115, 110, 126

[56] References Cited

U.S. PATENT DOCUMENTS 4,475,137  10/1984  Yasuda et al. .................. 360/125 X

FOREIGN PATENT DOCUMENTS

| 0032310 | 3/1979 | Japan | 360/122 |
| 0113119 | 9/1980 | Japan | 360/122 |
| 0203214 | 12/1982 | Japan | 360/122 |
| 0130419 | 8/1983 | Japan | 360/125 |
| 0164012 | 9/1983 | Japan | 360/110 |
| 0079416 | 5/1984 | Japan | 360/122 |
| 0213012 | 12/1984 | Japan | 360/122 |

Primary Examiner—Robert S. Tupper
Assistant Examiner—Andrew L. Sniezek
Attorney, Agent, or Firm—Roberts, Spiecens & Cohen

[57] ABSTRACT

A magnetic recording and/or reproducing element comprises a main element body, and windings wound around the main element body. The main element body has a pair of extremely thin layers made from a ferromagnetic material, and the extremely thin layers oppose each other at respective edges thereof so as to constitute a gap. Each of the thin layers are sandwiched between a pair of support members which are made from a nonmagnetic and abrasion proof material. A contact surface is formed on a vertex part of the main element body, for making contact with a magnetic recording medium so as to record and/or reproduce a signal on and/or from the magnetic recording medium. The main element body has one or a plurality of side surfaces which form a predetermined angle with respect to the contact surface and define the peripheral edge of the contact surface so that the contact surface has a predetermined shape with an extremely small area and has the gap at an approximate center of the predetermined shape.

14 Claims, 11 Drawing Figures

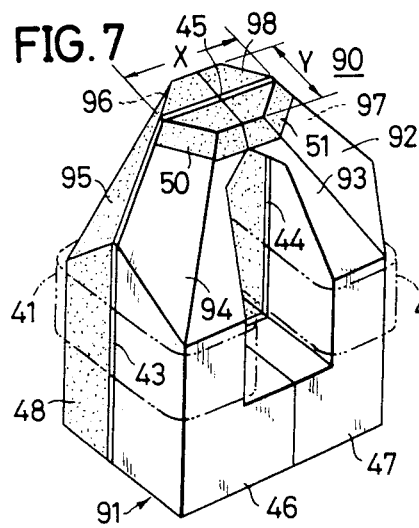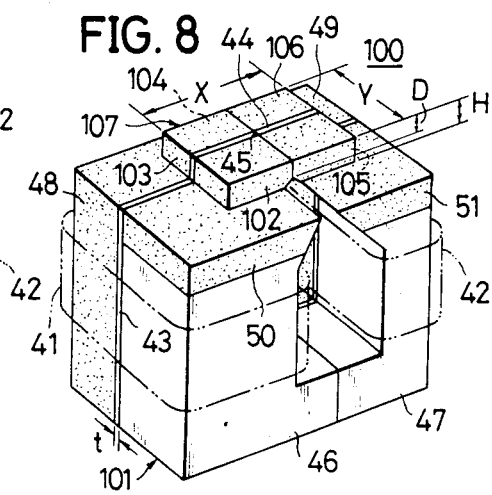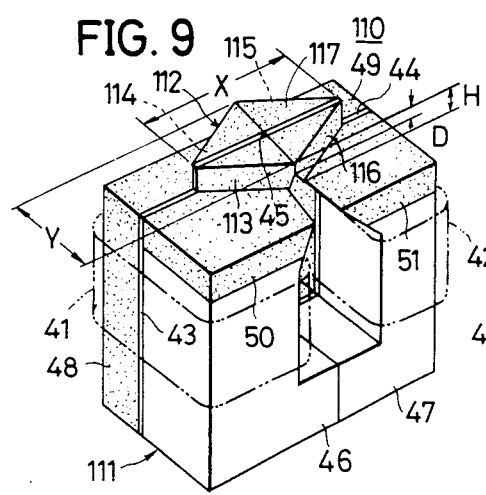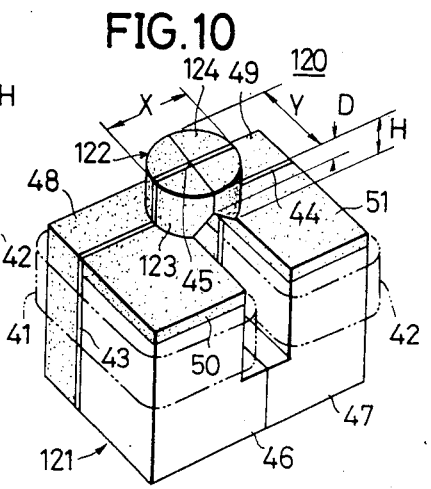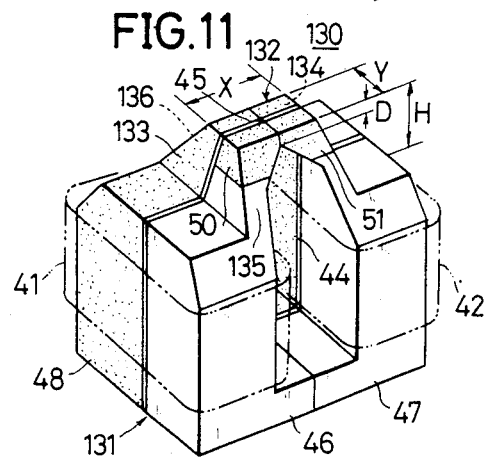

MAGNETIC RECORDING AND/OR REPRODUCING ELEMENT

BACKGROUND OF THE INVENTION

The present invention generally relates to magnetic recording and/or reproducing elements for recording and/or reproducing apparatuses, and more particularly to a magnetic recording and/or reproducing element which is suited for use in a so-called electronic camera which records and reproduces a video signal obtained by an image-pickup.

A so-called electronic camera which records a video signal on a flexible hollow cylinder shaped magnetic recording medium (hereinafter simply referred to as a magnetic drum), was previously proposed in a U.S. patent application Ser. No. 436,442 entitled "RECORDING AND/OR REPRODUCING APPARATUS" and filed Oct. 25, 1982, (now U.S. Pat. No. 4,567,535) in which the assignee is the same as the assignee of the present application. This electronic camera was proposed as a potential replacement of the conventional still picture camera using an optical 35 mm film. The electronic camera has a main camera body which is substantially the same in size as a main camera body of a normal 35 mm single-lens reflex camera. The magnetic drum is rotated at a rotational speed of 3600 rpm within the main camera body, and a video signal obtained by picking up an image by a solid-state pickup element such as a charge coupled device (CCD) is magnetically recorded on the magnetic drum by a magnetic recording and reproducing element. The magnetic recording and reproducing element records the video signal at a rate of one field per revolution of the magnetic drum, and is successively moved along a longitudinal direction of the magnetic drum.

In such an electronic camera, circular tracks which are formed on the peripheral surface of the magnetic drum have an extremely small track width of under 5 μm, in order to obtain a large recording capacity with the small magnetic drum. Hence, a gap which is formed in the magnetic recording and reproducing element must be set to the extremely small track width of under 5 μm.

In the magnetic recording and reproducing element which has the gap with the extremely small track width, the gap is formed between two ferromagnetic layers which are extremely thin and oppose each other at respective edges thereof. The ferromagnetic thin layers have a thickness which is in correspondence with the track width. Each ferromagnetic thin layer is sandwiched between non-magnetic support blocks which are abrasion proof. A part of such a magnetic recording and reproducing element, which makes contact with the rocording medium, has a relatively large area and is not subjected to a special processing.

When the magnetic recording and reproducing element having the construction described above is used in the electronic camera, a predetermined contact part including the gap of the magnetic recording and reproducing element makes contact with an arcuate surface part of the peripheral surface of the magnetic drum when the magnetic recording and reproducing element assumes a regular position. However, when the position where the magnetic recording and reproducing element makes contact with the peripheral surface of the magnetic drum deviates in a circumferential direction from the regular position, a part of the magnetic recording and reproducing element other than the predetermined contact part makes contact with the peripheral surface of the magnetic drum, and the gap is no longer in contact with the peripheral surface of the magnetic drum. Because the magnetic recording and reproducing element is in contact with the peripheral surface of the magnetic drum cartridge over a relatively large area, a distance between the gap and a position where the magnetic recording and reproducing element actually makes contact with the peripheral surface of the magnetic drum increases as the deviation from the regular position increases. As a result, a separation between the gap and the peripheral surface of the magnetic drum increases as the deviation from the regular position increases.

Consequently, the known spacing loss becomes large to such an extent that the spacing loss is not negligible, and the signal-to-noise (S/N) ratio of the reproduced signal becomes deteriorated. In a case where the track width is extremely narrow as described before, the magnetic energy contained in the tracks is small, and the deterioration in the S/N ratio of the reproduced signal due to the spacing loss becomes a serious problem.

SUMMARY OF THE INVENTION

Accordingly, it is a general object of the present invention to provide a novel and useful magnetic recording and/or reproducing element in which the problems described heretofore are eliminated.

Another and more specific object of the present invention is to provide a magnetic recording and/or reproducing element comprising a main element body having such a shape that a surface containing a gap is defined by sloping surfaces or vertical surfaces, and a tip end of the main element body is formed as a vertex surface having an extremely small area containing the gap at an approximate center thereof. According to the magnetic recording and/or reproducing element of the present invention, the area of a surface of the magnetic recording and/or reproducing element in contact with a recording medium, is extremely small. Hence, even when the recording and/or reproducing element makes contact with a peripheral surface of a magnetic drum at a position deviated from a regular position, the gap will be separated from the peripheral surface by only a slight distance. Therefore, the spacing loss is small, and the deterioration in the S/N ratio of the reproduced signal can be kept to a minimum.

Other objects and further features of the present invention will be apparent from the following detailed description when read in conjunction with the accompanying drawings.

BRIEF DESCRIPTION OF THE DRAWINGS

FIGS. 4 through 7 are perspective views respectively showing modifications of the first embodiment of the magnetic recording and/or reproducing element shown in FIG. 2;

FIG. 8 is a perspective view showing a second embodiment of a magnetic recording and/or reproducing element according to the present invention; and FIGS. 9 through 11 are perspective views respectively showing modifications of the second embodiment of the magnetic recording and/or reproducing element shown in FIG. 8.

DETAILED DESCRIPTION

Figure 1:
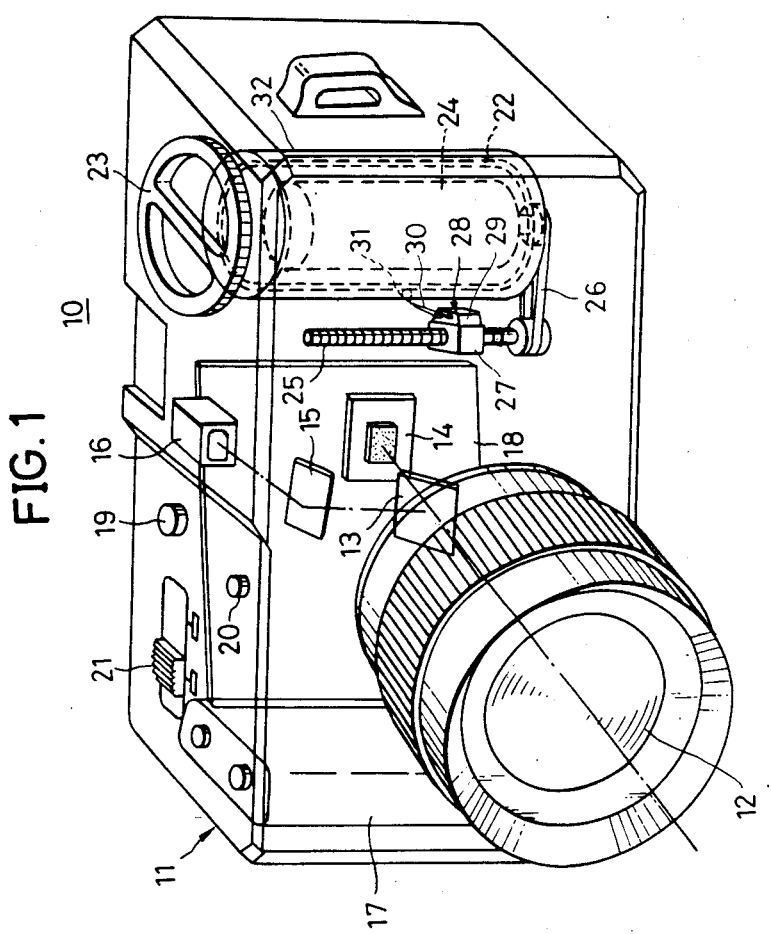
FIG. 1 is a perspective view showing an example of an image pickup recording and/or reproducing apparatus which may be applied with a magnetic recording and/or reproducing element according to the present invention.

First, a generl description will be given with respect to an example of an image pickup recording and/or reproducing apparatus which may be applied with a magnetic recording and/or reproducing element according to the present invention. An image pickup recording and/or reproducing apparatus 10 comprises an external frame 11 which has a shape generally similar to that of a 35 mm single-lens reflex camera. Although the external frame 11 is shown in a perspective view as a transparent frame for convenience's sake in order to explain the inner construction thereof, the external frame 11 is actually opaque. Light from an object (not shown) which is to be picked up and recorded passes through a lens system 12 and a half mirror 13, and is then projected to a solid-state pickup element 14 comprising a CCD, for example. The light thus projected to the pickup element 14 is converted into a video signal. A part of the light which is passed through the lens system 12 is reflected at the half mirror 13 to reach a view finder 16 after being further reflected at a mirror 15. A battery 17 is a power source to a printed circuit device 18 provided with the pickup element 14, a motor 24 which will be described hereinafter, and the like. Similarly as in a normal camera, a shutter button 19, a release button 20, and an operation switch 21 are provided on the upper surface of the external frame 11.

A magnetic drum 22 is loaded into or unloaded from a drive assembly 32 within the apparatus 10, by opening a lid 23. The cartridge 22 is hollow, and the motor 24 is relatively inserted into the magnetic drum 22 in its loaded state, as will be described hereinafter. A feed screw 25 is rotated by the motor 24 by way of a belt 26. A feed but 27 is screwed onto the feed screw 25, and a magnetic recording and/or reproducing element device 28 is mounted on the nut 27. The magnetic recording and/or reproducing element device 28 moves upwardly or downwardly as the feed screw 25 rotates.

The magnetic recording and/or reproducing element device 28 comprises an actuator 29, a cantilever 30 which is operated by the actuator 29, and a magnetic recording and/or reproducing element (hereinafter simply referred to as an element) 31 according to the present invention. The element 31 is fixed to a tip end of the cantilever 30, and makes contact with a peripheral surface of the magnetic drum 22.

In an image pickup and recording mode of the apparatus 10, the magnetic drum 22 rotates in the direction of an arrow C at a rotational speed of 3600 rpm. The element 31 relatively scans over the peripheral surface of the magnetic drum 22, and records a video signal related to the picked up image by forming tracks on the peripheral surface of the magnetic drum 22. On the other hand, in a reproducing mode of the apparatus 10, the magnetic drum 22 also rotates at the rotational speed of 3600 rpm as in the case during the pickup and recording mode, and the element 31 relatively scans over the tracks on the peripheral surface of the magnetic drum 22 so as to reproduce the video signal. During the reproducing mode, the element 31 is displaced by the actuator 29, and the element 31 scans over the tracks in a state where the tracking is controlled.

Next, description will be given with respect to a first embodiment of the element according to the present invention, by referring to FIG. 2 which shows the structure of the element 31 shown in FIG. 1.

Figure 2:
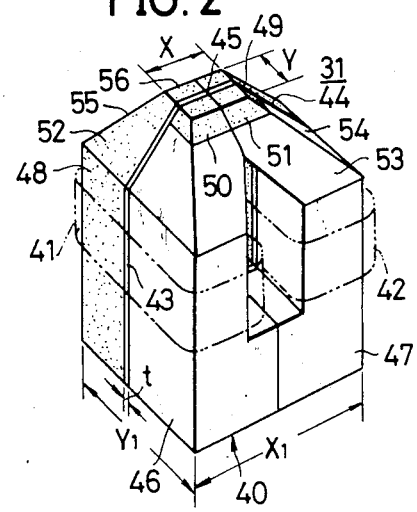
FIG. 2 is a perspective view showing a first embodiment of a magnetic recording and/or reproducing element according to the present invention.

In FIG. 2, the element 31 comprises a main element body 40 having windings 41 and 42 indicated by two-dot chain lines, which windings 41 and 42 are in the range of 20 turns. Thin layers 43 and 44 made from an alloy which is ferromagnetic, oppose each other at respective edges thereof with a layer which is made from silicon dioxide interposed therebetween so as to constitute a gap 45. The thin layers 43 and 44 have a thickness t which is equal to the track width of tracks which are to be formed on the peripheral surface of the magnetic drum 22. The thin layer 43 is sandwiched between a ferrite block 46 and a ceramic block 48, and the thin layer 44 is sandwiched between a ferrite block 47 and a ceramic block 49. A magnetic path is formed by the thin layers 43 and 44 and the ferrite blocks 46 and 47. In a vicinity of the gap 45, the thin layer 43 is sandwiched between the ceramic block 48 and a small ceramic block 50, and the thin layer 44 is sandwiched between the ceramic block 49 and a small ceramic block 51. Hence, a magnetic path is formed by the thin layers 43 and 44 in the vicinity of the gap 45.

The vertex portion of the main element body 40 has a truncated pyramid shape. A vertex surface of the main element body 40, which is a contact surface 56 which makes contact with the peripheral surface of the magnetic drum 22, is defined by four sloping surfaces 52 through 55 of the truncated pyramid. In other words, the contact surface 56 is a rectangular surface having an extremely small area and having the gap 45 at an approximate center thereof. The sloping surfaces 52 through 55 are formed between the outer peripheral surfaces of the main element body 40 and the contact surface 56. The length of one side X of the contact surface 56 along the relative scanning direction with respect to the magnetic drum 22, in under 100 μm. Further, the length of another side Y of the contact surface 56 along a direction perpendicular to the relative scanning direction, is also under 100 μm, where the other side Y is adjacent to the one side X. The projected area of the main element body 40 in the plan view, is represented by $X_1$ by $Y_1$. Hence, the area of the contact surface 56 is approximately 1/30 the area $X_1$ by $Y_1$.

Although the area of the contact surface 56 is extremely small, a large part of the contact surface 56 is constituted by the ceramic surface, and the contact surface 56 is sufficiently abrasion proof. The vertex part of the main element body 40 is narrow, however, the ceramic blocks 48 and 49 and the small ceramic blocks 50 and 51 provide sufficient support and strength.

Figure 3:
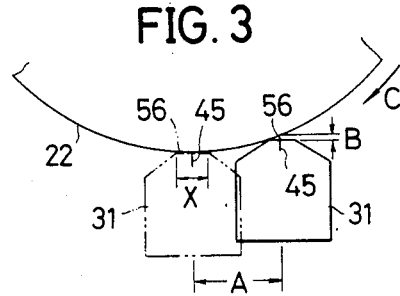
FIG. 3 shows a state where the magnetic recording and/or reproducing element shown in FIG. 2 makes contact with a magnetic drum.

Normally, the element 31 assumes the regular position indicated by a two-dot chain line in FIG. 3, and the entire contact surface 56 makes contact with the peripheral surface of the magnetic drum 22 which rotates in the direction of the arrow C. However, when the element 31 deviates from the regular position by a distance A, a part of the contact surface 56 closer to the peripheral surface of the magnetic drum 22, makes contact with the peripheral surface of the magnetic drum 22. As a result, the gap 45 becomes separated from the peripheral surface of the magnetic drum 22 by a distance B.

But since the length X of the contact surface 56 along the scanning direction is equal to 100 μm which is extremely small, the distance B becomes extremely small. As a result, the spacing loss is small, and the deterioration in the S/N ratio of the reproduced signal can be kept to a minimum. Therefore, according to the element 31, it is possible to obtain a reproduced signal which has minimized deterioration in the S/N ratio due to the spacing loss, and thus, it is possible to obtain a reproduced picture having a high picture quality from the reproduced signal.

Next, description will be given with respect to modifications of the first embodiment by referring to FIGS. 4 through 7. In FIGS. 4 through 7, those parts which are the same as those corresponding parts in FIG. 2 are designated by the same reference numerals, and their description will be omitted.

Figure 4:
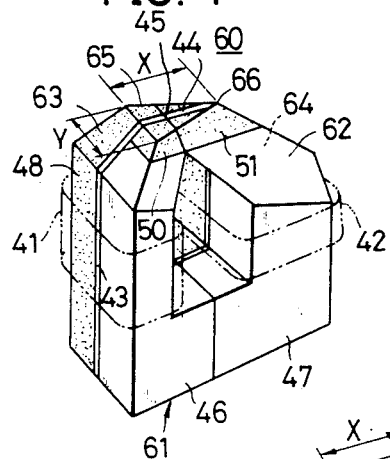

In the modification shown in FIG. 4, a magnetic recording and/or reproducing element 60 comprises a main element body 61. A vertex part of the main element body 61 has a truncated triangular pyramid shape. A vertex contact surface 65 of the main element body 61 has a triangular shape defined by sloping surfaces 62, 63, and 64, and the gap 45 is at an approximate center of the triangular contact surface 65. The contact surface 65 has an apex 66 at a front end thereof along the relative scanning direction with respect to the cartridge 22. For this reason, in addition to the effects described before, there is an advantage in that dust particles or the like are less likely to adhere to the contact surface 65.

Figure 5:
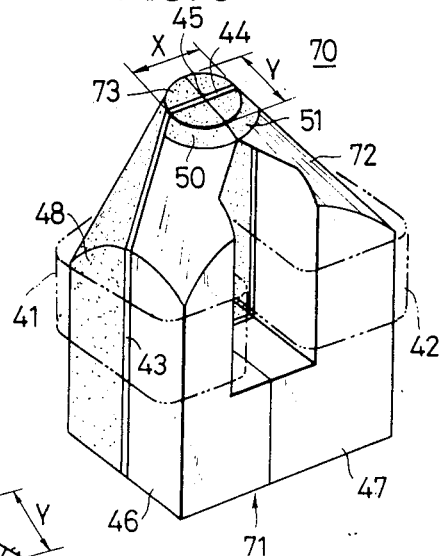

In the modification shown in FIG. 5, a magnetic recording and/or reproducing element 70 comprises a main element body 71. A vertex part of the main element body 71 has a truncated cone shape. A vertex contact surface 73 of the main element body 71 has a circular shape and has the gap 45 at an approximate center thereof.

Figure 6:
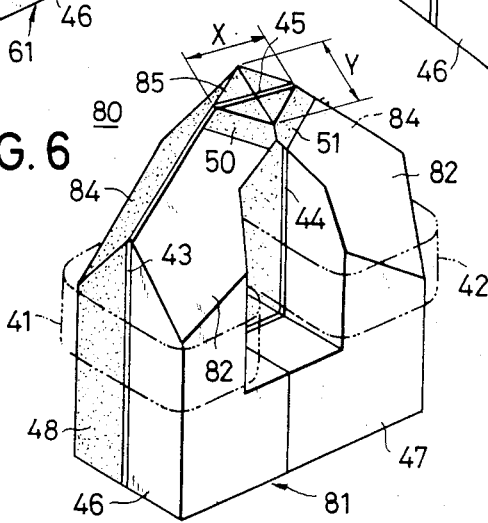

In the modification shown in FIG. 6, a magnetic recording and/or reproducing element 80 comprises a main element body 81. A vertex part of the main element body 81 has a truncated pyramid shape. A vertex contact surface 86 of the main element body 81 has a parallelogram shape defined by sloping surfaces 82 through 85, and the gap 45 is at an approximate center of the contact surface 86. Two diagonally opposite corners of the contact surface 86 constitute the front and rear ends thereof along the relative scanning direction with respect to the cartridge 22.

In the modification shown in FIG. 7, a magnetic recording and/or reproducing element 90 comprises a main element body 91. A vertex part of the main element body 91 has a truncated hexagonal pyramid shape. A vertex contact surface 98 of the main element body 91 has a hexagonal shape defined by sloping surfaces 92 through 97, and the gap 45 is at an approximate center of the hexagonal contact surface 98. Two mutually opposing vertexes of the hexagonal contact surface 98 constitute the front and rear ends thereof along the relative scanning direction with respect to the cartridge 22.

In the modifications shown in FIGS. 4 through 7, the elements 60, 70, 80 and 90 respectively have contact surfaces 65, 73, 86, and 98 each having an extremely small area. For this reason, the effects which are obtained in the element 31 shown in FIG. 2, can also be obtained in the elements 60, 70, 80, and 90.

However, in the elements 31, 60, 70, 80, and 90 described heretofore, the areas of the contact surfaces 56, 65, 73, 86, 98 gradually increase as the respective tip ends of the main element bodies 40, 61, 71, 81, and 91 wear out due to friction. As a result, the lengths X shown in FIGS. 2 and 4 through 7 gradually increase. Consequently, when the elements 31, 60, 70, 80, and 90 having the worn out contact surfaces 56, 65, 73, 86, 98 deviate from the respective regular positions as shown in FIG. 3, the respective distances B become larger and the respective spacing losses increase compared to the cases where the contact surfaces 56, 65, 73, 86, 98 are not worn. Therefore, although it is not critical from the practical point of view, there is a problem in that the S/N ratio of the reproduced signal becomes gradually deteriorated as the wear of the contact surface progresses.

Next, a description will be given with respect to a second embodiment of the magnetic recording and/or reproducing element in which the above problem is eliminated, by referring to FIG. 8. In FIG. 8, those parts which are the same as those corresponding parts in FIG. 2 are designated by the same reference numerals, and their description will be omitted.

A magnetic recording and/or reproducing element 100 shown in FIG. 8 comprises a main element body 101. A projecting part 107 having the shape of a rectangular column, is formed at a vertex part of the main element body 101. A contact surface 106 of the main element body 101 is formed on top of the projecting parr 107, and has a rectangular shape defined by vertical surfaces 102 through 105 which constitute the peripheral side surfaces of the rectangular column. The gap 45 is at an approximate center of the rectangular contact surface 106. The lengths X and Y of the sides of the rectangular contact surface 106 are both under 100 μm. A height H of the projecting part 107 is greater than a distance D which corresponds to the the maximum permissible wear of the projecting part 107, that is, the serviceable life of the element 100. The mechanical strength of the projecting part 107 is in the same range as the mechanical strength of the element 31 described before, and the projecting part 107 is abrasion proof to the same extent as the element 31 described before.

The element 100 records or reproduces the video signal on or from the magnetic drum 22 in a state where the contact surface 106 relatively scans over the peripheral surface of the magnetic drum 22. When the element 100 is used over a long period of time, the projecting part 107 wears out due to friction, however, the size and shape of the contact surface 106 do not change and are maintained to the original size and shape. For this reason, even when the wear of the projecting part 107 progresses, the extent of the spacing loss which occurs due to the deviation of the element 100 from the regular position where the element 100 should make contact with the peripheral surface of the magnetic drum 22, is the same as that at the time when the element 100 is new and the contact surface 106 is not worn. With respect to the spacing loss, the performance of the element 100 is the same at the time when the element 100 is new until the wear of the projecting part 107 becomes equal to D, that is, until the serviceable life of the element 100 expires.

The projecting part 107 can be formed with ease by using an abrasive disc (not shown) comprising a first groove having the width X and a second groove having the width Y. In other words, the vertical surfaces 103 and 105 are formed by pressing the vertex part of the main element body 101 against the rotating abrasive disc, in a state where the gap 45 is aligned to the center of the first groove of the abrasive disc. Then, the main element body 101 is rotated over an angle of 90°, and the vertical surfaces 102 and 104 are formed by pressing the vertex part of the main element body 101 against the rotating abrasive disc, in a state where the gap 45 is aligned to the center of the second groove of the abrasive disc. The vertex part of the main element body 101 which is not removed by the abrasive disc, remains as the projecting part 107.

Because the sloping surfaces are formed on the ceramic blocks 48 and 49 and the ferrite blocks 46 and 47, the windings 41 and 42 are stably maintained in respective positions.

Next, description will be given with respect to modifications of the second embodiment described heretofore, by referring to FIGS. 9 through 11. In FIGS. 9 through 11, those parts which are the same as those corresponding parts in FIG. 8 are designated by the same reference numerals, and their description will be omitted.

In a magnetic recording and/or reproducing element 110 shown in FIG. 9, a projecting part 112 of a main element body 111 has a rectangular column shape. A contact surface 117 formed on top of the projecting part 112, has a parallelogram shape defined by vertical surfaces 113 through 116. The gap 45 is at an approximate center of the parallelogram shaped contact surface 117.

In a magnetic recording and/or reproducing element 110 shown in FIG. 10, a projecting part 122 of a main element body 121 has a cylindrical column shape. A contact surface 124 formed on top of the projecting part 122, has a circular shape defined by a vertical surface 123. The gap 45 is at an approximate center of the circular contact surface 124.

According to the elements 110 and 120, the shapes of the contact surfaces 117 and 124 do not change as the wear of the projecting parts 112 and 122 progress, as in the case of the element 100 described before. Thus, the effects of the elements 110 and 120 are the same as the effects of the element 100.

In a magnetic recording and/or reproducing element 130 shown in FIG. 11, a projecting part 132 of a main element body 131 has a column shape. A contact surface 137 formed on top of the projecting part 132, has a rectangular shape defined by vertical surfaces 133 and 134 and sloping surfaces 135 and 136. The gap 45 is at an approximate center of the rectangular contact surface 132. The front and rear sides of the projecting part 132 along the relative scanning direction with respect to the magnetic drum 22, are constituted by the vertical surfaces 133 and 134. For this reason, the length X will not change even when the wear of the projecting part 132 progresses, and the performance of the element 130 with respect to the spacing loss will not change.

Further, the present invention is not limited to these embodiments, but various variations and modifications may be made without departing from the scope of the present invention.

What is claimed is:

1. A magnetic recording and/or reproducing element which is used in a magnetic recording and/or reproducing apparatus for playing a rotating cylindrical recording medium, said magnetic recording and/or reproducing element being fed in a longitudinal direction parallel to the axis of the cylindrical recording medium so as to record and/or reproduce a signal on and/or from a peripheral surface of the cylindrical recording medium, said magnetic recording and/or reproducing element comprising:

a main element body comprising first and second pairs of support blocks and first and second layers of a ferromagnetic material of extremely small thickness, said first ferromagnetic layer being sandwiched between said first pair of support blocks so as to form therewith a first half of said main element body, said second ferromagnetic layer being sandwiched between said second pair of support blocks so as to form therewith a second half of said main body element, said first and second halves of said main body element being opposingly arranged so that respective edges of said first and second ferromagnetic layers constitute a gap for said magnetic recording and/or reproducing element at one end of said main element body, said first and second pairs of support blocks and said first and second ferromagnetic layers forming a portion of truncated shape in the vicinity of said one end of said main element body and forming a columnar portion in the vicinity of the other of the ends of said main element body; and windings on said main element body so that said first and second halves of said main element body are wound with said windings;

said portion of truncated shape having a substantially planar contact surface facing the cylindrical recording medium and formed on a distal end of said portion of truncated shape, and at least one side surface which forms a predetermined angle with respect to said contact surface and defines a peripheral edge of said contact surface so that said contact surface has a predetermined shape with said gap approximately at the center of said predetermined shape, said first and second pairs of support blocks being made of a non-magnetic material having relatively high abrasion resistance at least in the vicinity of said contact surface, said contact surface in its entirety making contact with the peripheral surface of the cylindrical recording medium when said magnetic recording and/or reproducing element is in a predetermined position in said magnetic recording and/or reproducing apparatus, said at least one side surface comprising a sloping surface formed between the peripheral edge of said contact surface and a peripheral surface of said columnar portion so that the cross-sectional area of the portion of truncated shape, in planes parallel to said contact surface, continuously decreases from said columnar portion toward said contact surface, said columnar portion having a substantially constant cross-sectional area in planes parallel to said contact surface and is devoid of said windings, said contact surface having an area which is approximately 1/30th of said cross-sectional area of said columnar part in a plane parallel to said contact surface, said contact surface having two dimensions in first and second directions, respectively, said first direction coinciding with the longitudinal direction of the cylindrical recording medium when said magnetic recording and/or reproducing element is in said predetermined position in said magnetic recording and/or reproducing apparatus, said second direction being perpendicular to said first direction, said two dimensions of said contact surface each being no greater than 100 μm, so that any separation between said gap and the peripheral surface of the cylindrical recording medium is small and a spacing loss of said signal is substantially negligible even when said magnetic recording and/or reproducing element deviates from said predetermined position to a position where only a part of said contact surface other than said gap makes contact with the peripheral surface of the cylindrical recording medium.

2. A magnetic recording and/or reproducing element as claimed in claim 1 in which said portion of truncated shape has a truncated pyramid shape, and said contact surface has a rectangular shape.

3. A magnetic recording and/or reproducing element as claimed in claim 1 in which said portion of truncated shape has a truncated triangular pyramid shape, and said contact surface has a triangular shape.

4. A magnetic recording and/or reproducing element as claimed in claim 3 in which an apex of said triangular contact surface constitutes a front end of said contact surface along a said second direction.

5. A magnetic recording and/or reproducing element as claimed in claim 1 in which said portion of truncated shape of said main element body has a hexagonal pyramid shape, and said contact surface has a hexagonal shape.

6. A magnetic recording and/or reproducing element as claimed in claim 1 in which one sloping surface is formed between the peripheral edge of said contact surface and the peripheral surface of said columnar portion, and said truncated shape part has a truncated cone shape.

7. A magnetic recording and/or reproducing element as claimed in claim 1 in which said columnar portion substantially has the shape of a rectangular parallelopiped, and said truncated shape portion is of truncated pyramid shape which extends from one end of said columnar part.

8. A magnetic recording and/or reproducing element as claimed in claim 1 in which said contact surface has a square shape, each side of which is 100 μm in length.

9. A magnetic recording and/or reproducing element as claimed in claim 1 in which four of said side surfaces are provided of which two sloping surfaces are formed between two parts of the peripheral edge of said contact surface and the peripheral surface of said columnar portion and two vertical surfaces are perpendicular to said contact surface and to a distal end surface of said columnar part.

10. A magnetic recording and/or reproducing element as claimed in claim 1 in which one support block in each pair of support blocks is made of a ferromagnetic material at a part thereof outside the vicinity of said contact surface.

11. A magnetic recording and/or reproducing element which is used in a magnetic recording and/or reproducing apparatus for playing a rotating cylindrical recording medium, said magnetic recording and/or reproducing element being fed in a longitudinal direction parallel to the axis of the cylindrical recording medium so as to record and/or reproduce a signal on and/or from a peripheral surface of the cylindrical recording medium, said magnetic recording and/or reproducing element comprising:

main element body comprising first and second pairs of support blocks and first and second layers of a ferromagnetic material of an extremely small thickness, said first ferromagnetic layer being sandwiched between said first pair of support blocks so as to form therewith a first half of said main element body, said second ferromagnetic layer being sandwiched between said second pair of support blocks so as to form therewith a second half of said main element body, said first and second halves of said main element body being opposingly arranged so that respective edges of said first and second ferromagnetic layers constitute a gap for said magnetic recording and/or reproducing element at one end of said main element body, said first and second pairs of support blocks and said first and second ferromagnetic layers forming a first columnar part in the vicinity of said one end of said main element body and a second columnar part in the vicinity of the other end of said main element body; and windings on said main element body so that said first and second halves of said main element body are wound with said windings, said first columnar part having a substantially planar contact surface facing the cylindrical recording medium and which is formed at a distal end of said first columnar part, and at least one side surface which forms a predetermined angle with respect to said contact surface and defines a peripheral edge of said contact surface so that said contact surface has a predetermined shape with said gap approximately at the center of said predetermined shape, said first and second pairs of support blocks being made of a non-magnetic material having a relatively high abrasion resistance at least in the vicinity of said contact surface, said contact surface in its entirety making contact with the peripheral surface of the cylindrical recording medium when said magnetic recording and/or reproducing element is in a predetermined position in said magnetic recording and/or reproducing apparatus, said first and second columnar parts being arranged in a stepped shape, said second columnar part having a substantially constant cross-sectional area in planes parallel to said contact surface and is devoid of said windings, said contact surface having an area which is approximately 1/30th the cross-sectional area of said second columnar part in a plane parallel to said contact surface, said contact surface having two dimensions in first and second directions, respectively, said first direction coinciding with the longitudinal direction of the cylindrical recording medium when said magnetic recording and/or reproducing element is in said predetermined position in said magnetic recording and/or reproducing apparatus, said second direction being perpendicular to said first direction, said two dimensions of said contact surface each being no greater than 100 μm so that any separation between said gap and the peripheral surface of the cylindrical recording medium is small and a spacing loss of said signal is substantially negligible even when said magnetic recording and/or reproducing element deviates from said predetermined position to a position where only a part of said contact surface other than said gap makes contact with the peripheral surface of the cylindrical recording medium.

12. A magnetic recording and/or reproducing element as claimed in claim 11 in which said contact surface has a rectangular shape.

13. A magnetic recording and/or reproducing element as claimed in claim 11 in which said contact surface has a circular shape.

14. A magnetic recording and/or reproducing element as claimed in claim 11 in which one support block in each pair of support blocks is made of a ferromagnetic material at a part thereof outside the vicinity of said contact surface.

* * * * *